US010269493B2

(12) United States Patent
Frank

(10) Patent No.: US 10,269,493 B2
(45) Date of Patent: Apr. 23, 2019

(54) MODULAR DENSE ENERGY ULTRA CELL AND PROCESS FOR FABRICATION

(71) Applicant: David Frank, Highland Beach, FL (US)

(72) Inventor: David Frank, Highland Beach, FL (US)

(*) Notice: Subject to any disclaimer, the term of this patent is extended or adjusted under 35 U.S.C. 154(b) by 176 days.

(21) Appl. No.: 15/168,042

(22) Filed: May 28, 2016

(65) Prior Publication Data

US 2017/0004929 A1    Jan. 5, 2017

Related U.S. Application Data

(63) Continuation-in-part of application No. 14/903,040, filed as application No. PCT/US2014/043416 on Jun. 20, 2014, now Pat. No. 9,899,154.

(60) Provisional application No. 62/323,647, filed on Apr. 16, 2016, provisional application No. 62/297,982, filed on Feb. 22, 2016, provisional application No. 62/293,910, filed on Feb. 11, 2016, provisional application No. 62/289,283, filed on Jan. 31, 2016, provisional application No. 62/277,596, filed on Jan. 12, 2016, provisional application No. 62/271,923, filed on Dec. 28, 2015, provisional application No. 62/271,996, filed on Dec. 28, 2015, provisional application No. 62/174,004, filed on Jun. 11, 2015, provisional application No. 61/983,407, filed on Apr. 23, 2014, provisional application No. 61/931,754, filed on Jan. 27, 2014, provisional application No. 61/910,921, filed on Dec. 2, 2013, provisional application No. 61/893,832, filed on Oct. 21, 2013, provisional application No. 61/875,076, filed on Sep. 8, 2013, provisional application No. 61/863,042, filed (Continued)

(51) Int. Cl.
*H01G 4/30* (2006.01)
*H01G 4/12* (2006.01)
*H01G 4/008* (2006.01)
*H01G 4/232* (2006.01)
*H01M 2/02* (2006.01)
*H01G 4/38* (2006.01)

(52) U.S. Cl.
CPC ............. *H01G 4/30* (2013.01); *H01G 4/0085* (2013.01); *H01G 4/1227* (2013.01); *H01G 4/38* (2013.01)

(58) Field of Classification Search
CPC ........ H01G 11/14; H01G 11/16; H01G 11/12; H01G 11/84; H01G 4/30; H01G 4/232; H01G 4/1209; H01G 4/12; H01G 4/008; H01M 2/029; H01M 2/0277
USPC .................... 361/301.4, 321.1, 321.2, 321.4
See application file for complete search history.

(56) References Cited

U.S. PATENT DOCUMENTS

| | | | |
|---|---|---|---|
| 2014/0041931 A1* | 2/2014 | Feichtinger | H01C 7/18 174/549 |
| 2015/0302993 A1* | 10/2015 | Park | H01G 4/30 174/260 |
| 2016/0255576 A1* | 9/2016 | Jiang | H04W 48/20 455/434 |

FOREIGN PATENT DOCUMENTS

WO    WO 2014138721 A1 *    9/2014    ............. H01G 11/36

* cited by examiner

*Primary Examiner* — Eric W Thomas
*Assistant Examiner* — Arun Ramaswamy
(74) *Attorney, Agent, or Firm* — Fleit Gibbons Gutman Bongini Bianco PL; Jose Gutman

(57) ABSTRACT

A hybrid ultra-capacitor and Dense Energy Ultra Cell (DEUC) energy storage device and methods of production are described. An example method uses spray deposition processes to deposit energy storage layers that are interleaved in between electrodes to enable rapid charge and dense energy storage in a scalable Element with efficient fabrication methods to support a wide variety of applications.

9 Claims, 9 Drawing Sheets

The DEUC Element is an Energy Storage Device with an MLCC Structure

Related U.S. Application Data on Aug. 7, 2013, provisional application No. 61/863,032, filed on Aug. 7, 2013, provisional application No. 61/862,210, filed on Aug. 5, 2013, provisional application No. 61/958,330, filed on Jul. 25, 2013, provisional application No. 61/958,169, filed on Jul. 22, 2013, provisional application No. 61/957,517, filed on Jul. 6, 2013, provisional application No. 61/168,768, filed on Apr. 13, 2009, provisional application No. 61/166,768, filed on Apr. 5, 2009.

Figure 1: Describes an Insulated Internal Barrier Capacitor (IBLC)
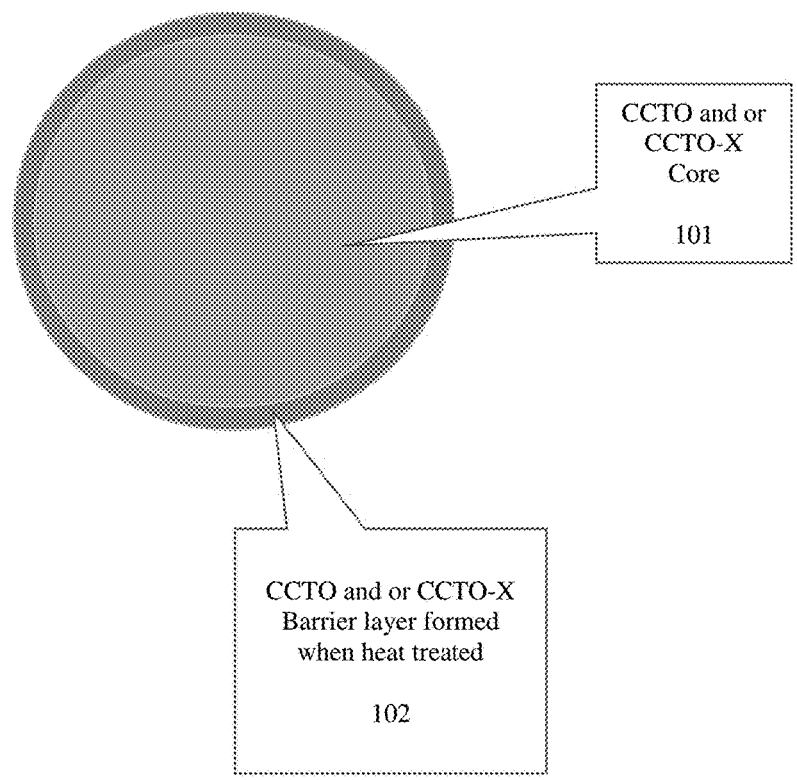

Figure 2: CCTO IBL with Insulator Particles
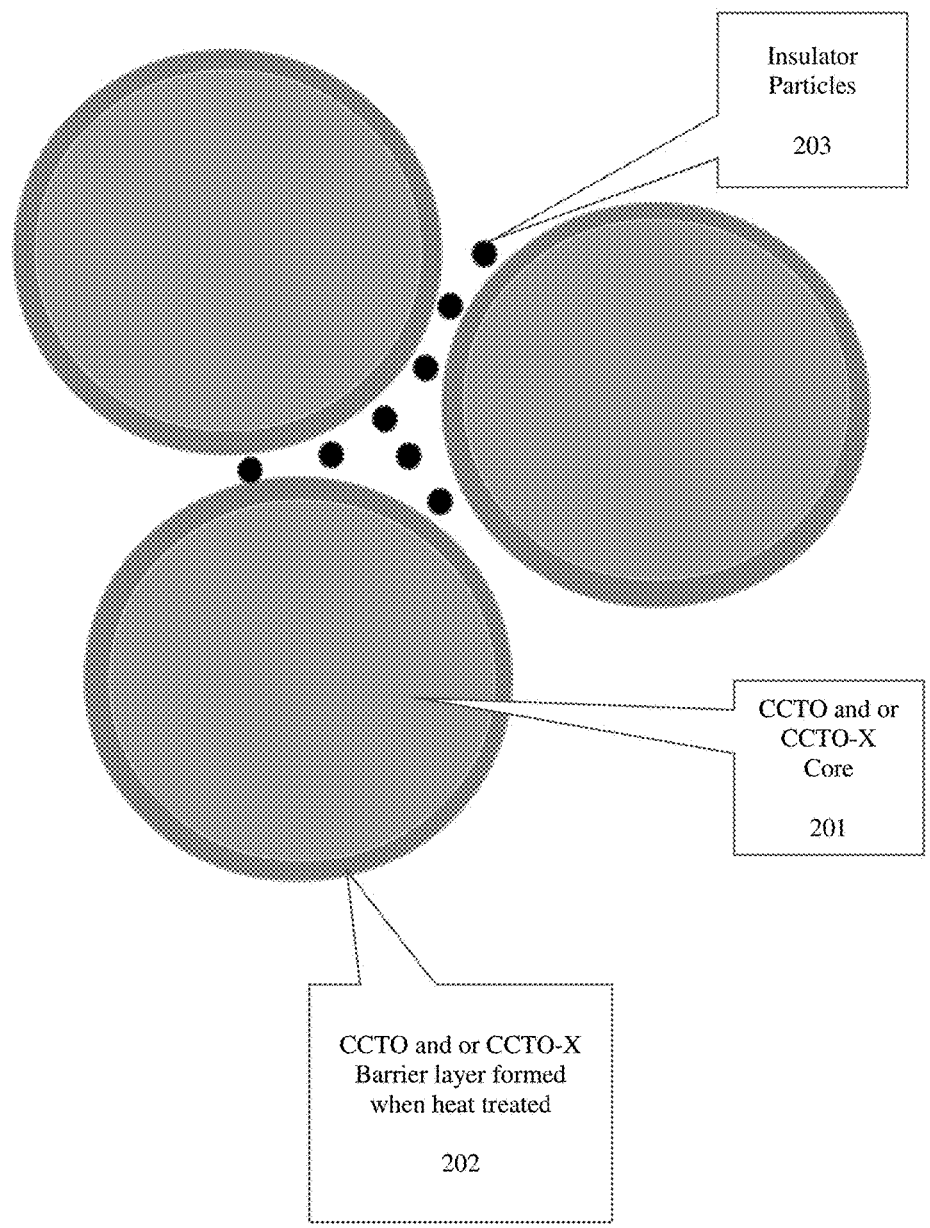

FIG. 3: An exploded view of an example DEUC Thin Film
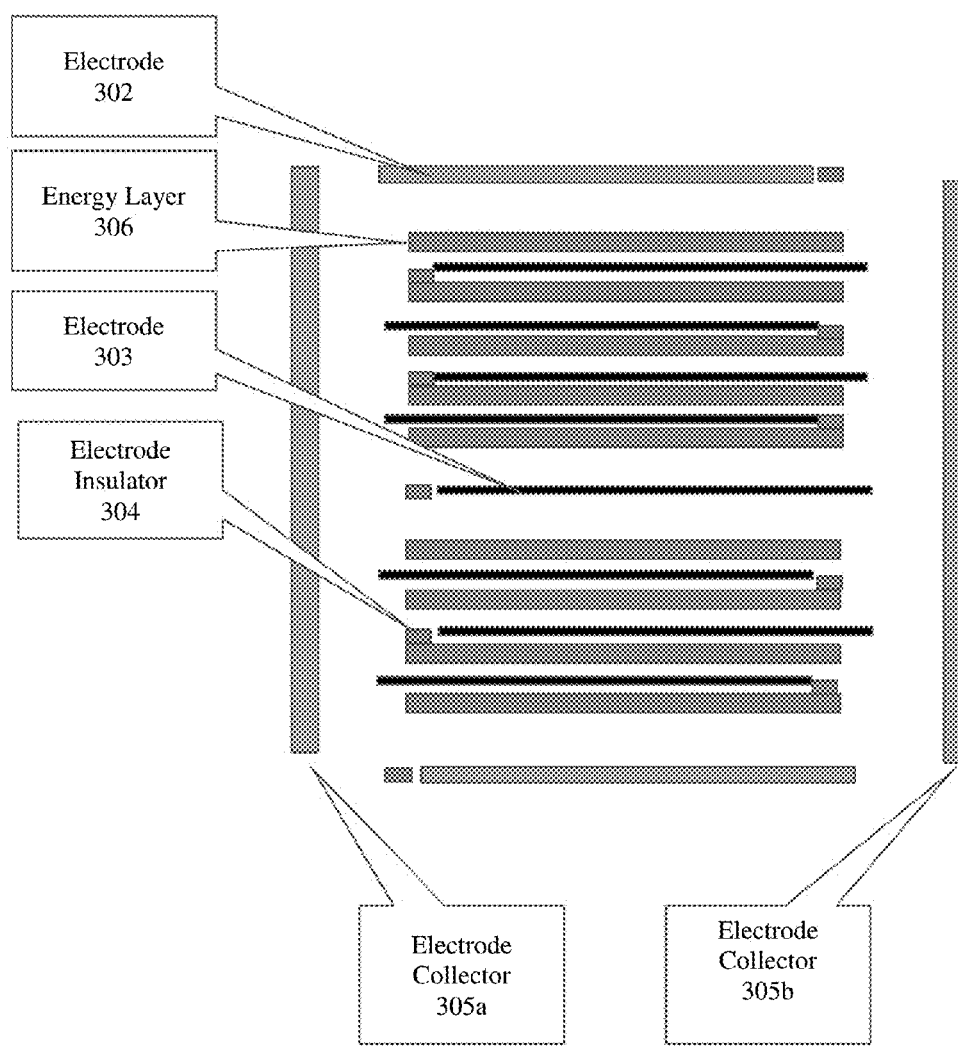

FIG. 4: A cross-sectional side view of an example DEUC Thin Film
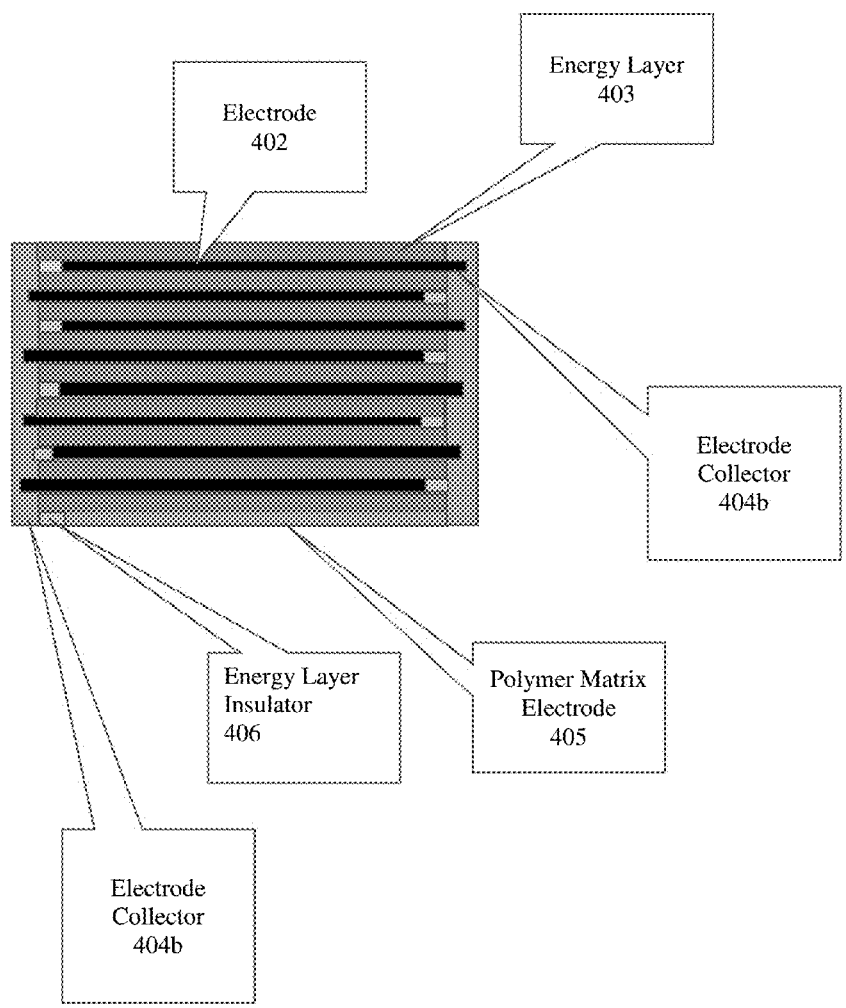

Figure 5: Energy Layer / Offset Electrode Design for DEUC energy storage layers
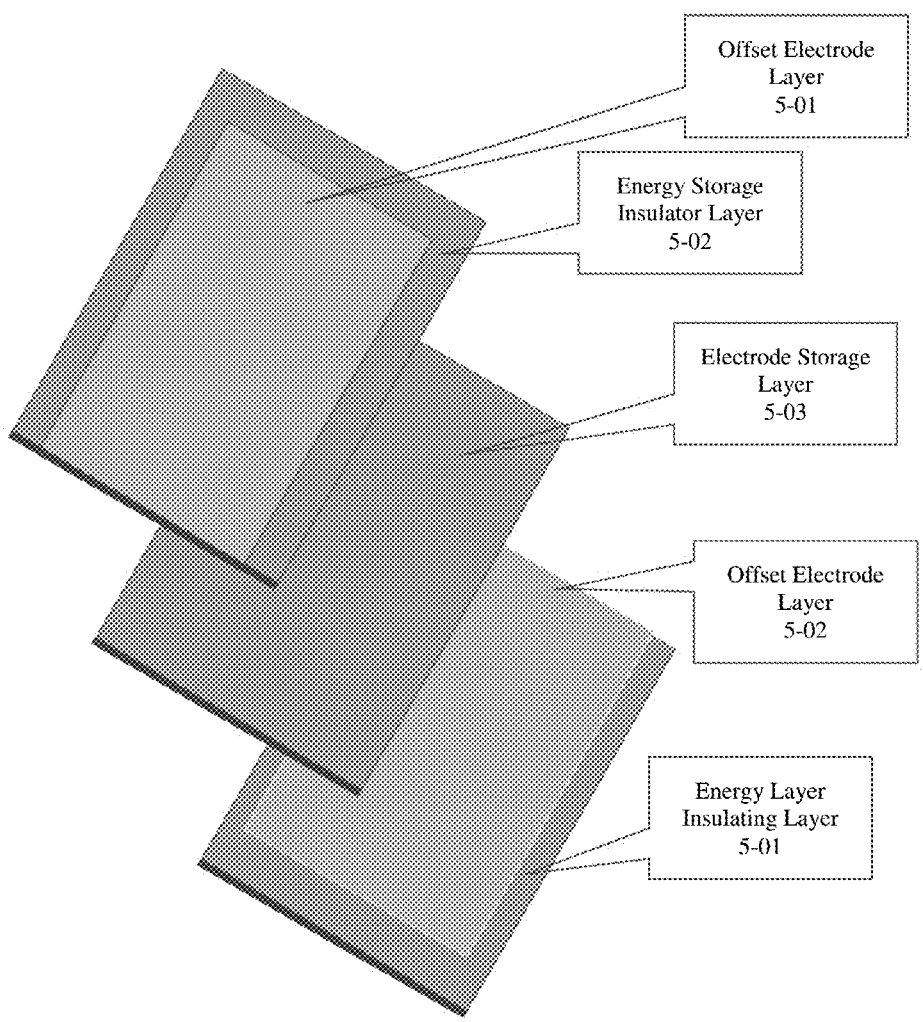

Figure 6: The DEUC Element is an Energy Storage Device with an MLCC Structure
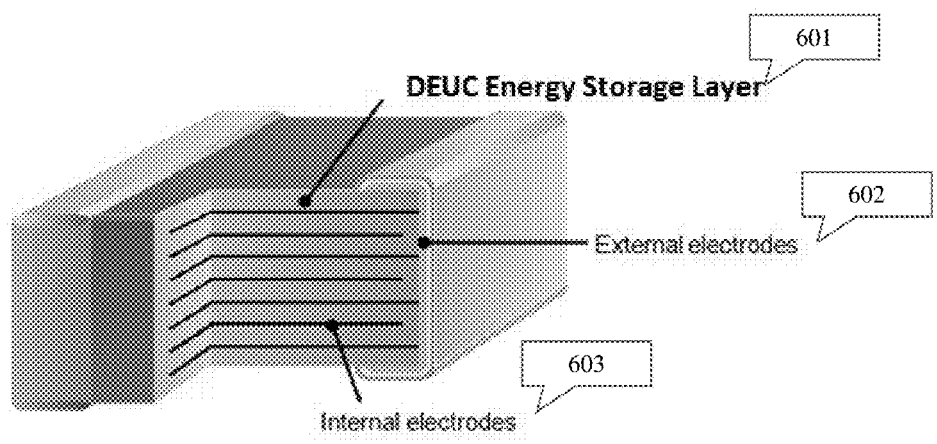

Figure 7: Example DEUC Module Components and Supporting Electronics
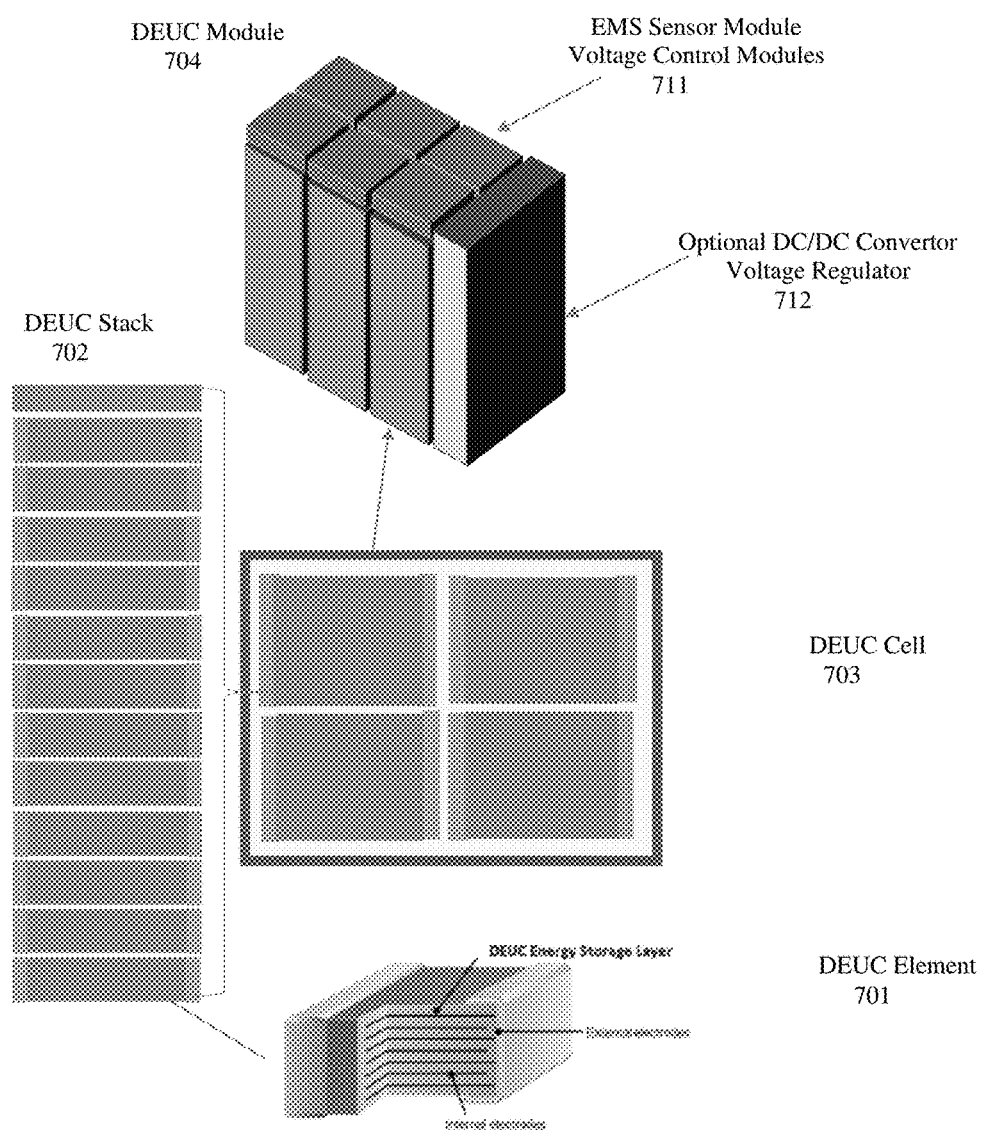

Figure 8: Multilayer DEUC Element Mounted on Circuit Board
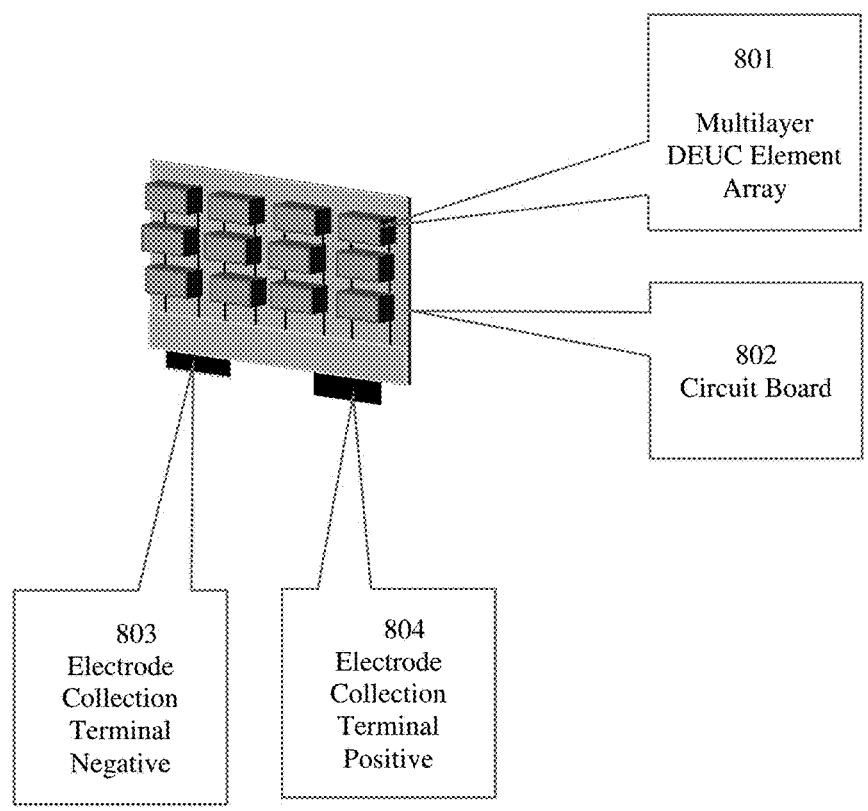

Figure 9: DEUC DC/DC Converter and Charge
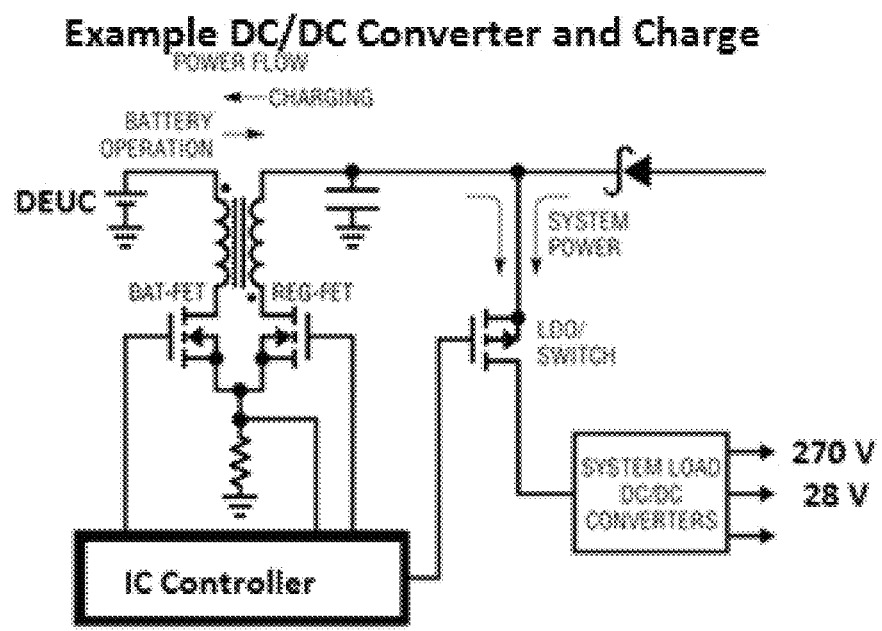

MODULAR DENSE ENERGY ULTRA CELL AND PROCESS FOR FABRICATION

CROSS-REFERENCES TO RELATED APPLICATION

This application is based upon and claims priority to U.S. Patent Application Ser. No. 62/323,647 filed on Mar. 16, 2016, and is based upon and claims priority to U.S. Patent Application Ser. No. 62/297,982 filed on Feb. 22, 2016, and is also based upon and claims priority to U.S. Patent Application Ser. No. 62/293,910 filed on Feb. 11, 2016, and is also based upon and claims priority to U.S. Patent Application Ser. No. 62/289,283 filed on Jan. 31, 2016 and is also based upon and claims priority to U.S. Patent Application Ser. No. 62/277,598 filed on Jan. 12, 2016, and is also based upon and claims priority to U.S. Patent Application Ser. No. 62/271,996 filed on Dec. 28, 2015, and is also based upon and claims priority to U.S. Patent Application Ser. No. 62/271,923 filed on Dec. 28, 2015, and is also based upon and claims priority to U.S. Patent Application Ser. No. 62/810,127 filed on Jun. 16, 2015, and is also based upon and claims priority to U.S. Patent Application Ser. No. 62/174,004 filed on Jun. 11, 2015, and is also based upon and claims priority to U.S. Patent Application Ser. No. 61/168,768 filed on May 30, 2015 the disclosure of all filings above are hereby incorporated by reference in its entirety. This application is a continuation in part to and based upon and claims priority to the US In-Country filing PCT Patent Application 14903040 (PCT/US14/43416) filed on Jan. 5, 2016, which is based upon and claims priority to U.S. Patent Application Ser. No. 61/957,517 filed on Jul. 6, 2013, the disclosure of which is hereby incorporated by reference in its entirety.

PCT Patent Application PCT/US2014/043416 is also based upon and claims priority to U.S. Patent Application Ser. No. 61/958,169 filed on Jul. 22, 2013, the disclosure of which is hereby incorporated by reference in its entirety. PCT Patent Application PCT/US2014/043416 is also based upon and claims priority to U.S. Patent Application Ser. No. 61/958,330 filed on Jul. 25, 2013, the disclosure of which is hereby incorporated by reference in its entirety. PCT Patent Application PCT/US2014/043416 is also based upon and claims priority to U.S. Patent Application Ser. No. 61/862,210 filed on Aug. 5, 2013, the disclosure of which is hereby incorporated by reference in its entirety. PCT Patent Application PCT/US2014/043416 is also based upon and claims priority to U.S. Patent Application Ser. No. 61/863,032 filed on Aug. 7, 2013, the disclosure of which is hereby incorporated by reference in its entirety. PCT Patent Application PCT/US2014/043416 is also based upon and claims priority to U.S. Patent Application Ser. No. 61/863,042 filed on Aug. 7, 2013, the disclosure of which is hereby incorporated by reference in its entirety. PCT Patent Application PCT/US2014/043416 is also based upon and claims priority to U.S. Patent Application Ser. No. 61/875,076 filed on Sep. 8, 2013, the disclosure of which is hereby incorporated by reference in its entirety. PCT Patent Application PCT/US2014/043416 is also based upon and claims priority to U.S. Patent Application Ser. No. 61/893,832 filed on Oct. 21, 2013, the disclosure of which is hereby incorporated by reference in its entirety. PCT Patent Application PCT/US2014/043416 is also based upon and claims priority to U.S. Patent Application Ser. No. 61/910,921 filed on Dec. 2, 2013, the disclosure of which is hereby incorporated by reference in its entirety. PCT Patent Application PCT/US2014/043416 is also based upon and claims priority to U.S. Patent Application Ser. No. 61/931,754 filed on Jan. 27, 2014, the disclosure of which is hereby incorporated by reference in its entirety. PCT Patent Application PCT/US2014/043416 is also based upon and claims priority to U.S. Patent Application Ser. No. 61/983,407 filed on Apr. 23, 2014, the disclosure of which is hereby incorporated by reference in its entirety.

FIELD OF THE INVENTION

The patent relates to a Dense Energy Ultra Cell (DEUC), an energy storage device utilizing dielectric layers interleaved between electrodes. The dielectric layers are created from Nano particles synthesized as high permittivity particles with high resistivity to retain charge.

BACKGROUND

The present disclosure generally relates to energy storage devices that are based on ultra-capacitors, and more particularly to a hybrid ultra-capacitor and dense energy power storage device and methods of fabrication thereof.

Current battery and rechargeable battery technologies do not lend themselves to a broad range of applications. Large and heavy batteries are applied to electric vehicles and contribute a significant portion of the weight of the vehicle to enable driving range. Miniature batteries have been developed in recent years to address miniature sensors and actuators such as biomedical devices and wireless communication systems.

In the middle are requirements for portable electronic devices such as cellphones and computers. Chemical battery technologies have limited numbers of charge cycles before degradation of the battery charge capacity and are limited to 4 volts or less per cell.

Current capacitors have limited energy density and dissipate the stored charge quickly.

Many important applications demand high energy density, high operating voltage per cell and an extended battery life-cycle.

Therefore a need exists to overcome the problems with the prior art as discussed above.

BRIEF SUMMARY

A hybrid ultra-capacitor and Dense Energy Ultra Cell (DEUC) energy storage device and methods of production are described using print processes to deposited energy storage layers that are interleaved in between electrodes to enable rapid charge and dense energy storage in a scalable Element with efficient fabrication methods to support a wide variety of applications.

The present invention enables the fabrication of an energy storage device with a base component that is comprised of a plurality of dielectric particles that form layers of less than 10 microns thick, with an internal resistivity of greater than 100 mega-ohms. These energy storage layers are interleaved in between electrode layers to form a multi-layer thin film. One or more multilayer thin films are applied to form a DEUC Element.

Three fabrication methods are described using print deposition:

Basic CCTO-X Particle Design

Layer One: An electrode layer comprised of a printable solution that has similar shrinkage characteristics to the other layers applied in the thin film. The electrode layer has conductive particles with a melt point greater than 1,200 degrees Celsius, such as nickel. The electrode is made from dielectric particles in a polymer slurry. The dielectric particles have similar grain growth and shrinkage as the energy storage layers. To simplify the design, we use the same dielectric particles in each layer. The conductive printable ink solution is deposited and subsequently dried to allow for the deposition of the next layer. A photo induced curing agent may be applied to the electrode solution to enable rapid curing under ultraviolet light.

Layer Two: An energy layer comprised of a high dielectric material such as $Ca_aCu_xTiyO_2$ and or the proprietary formula of CCTO-X. The energy layer may also have Al2O3 particles (or other electrically insulating particles) applied in the mix.

The energy storage layer solution is deposited and subsequently dried to allow for the deposition of the next layer. A photo induced curing agent may be applied to the electrode solution to enable rapid curing under ultraviolet light.

Layer three: An electrode layer comprised of a printable solution that has similar shrinkage characteristics to the other layers applied in the thin film. The electrode layer has conductive particles with a melt point greater than 1,200 degrees Celsius, such as nickel. The electrode is made from dielectric particles in a polymer slurry. The dielectric particles have similar grain growth and shrinkage as the energy storage layers. To simplify the design, we use the same dielectric particles in each layer. The conductive printable ink solution is deposited and subsequently dried to allow for the deposition of the next layer. A photo induced curing agent may be applied to the electrode solution to enable rapid curing under ultraviolet light.

To simplify the design, we use the same dielectric particles in each layer. The conductive paste and or printable ink solution is deposited and subsequently dried to allow for the deposition of the next layer.

A multi-layer thin film is created by repeating layers 1 through 3 listed above.

The layers are fabricated using a binder to hold the solution together. The binders are burned off during the heat treatment and sintering process.

The multi-layer thin film is sintered to form a DEUC Element.

A calcination step may be introduced before sintering where the multilayer thin film is heat treated to around 700 to 900 degrees Celsius.

The sintering process may be a single stage or a two stage process that ramps to a temporary high sintering temperature with a short dwell time and moves to a lower sintering temperature for a longer dwell time.

The sintering of the multilayer thin film results in the formation of a resistive barrier around the CCTO and or CCTO-X particle core. This resistive barrier forms an internal barrier capacitor. Modifications of the stoichiometric formula of CCTO where the copper content is decreased and or the Ti content is increased or decreased to raise the resistivity of the barrier when sintered.

The sintering of the multilayer thin film results in a conversion of the core-shell particles into an insulated inner barrier layer capacitor (IIBLC) energy storage device based.

In some respects, the fabrication method for the DEUC thin film is similar to the fabrication of multi-layer ceramic capacitors (MLCC) but with critical differences to enable energy storage. The DEUC does not use a "green tape" as in the MLCC fabrication. The DEUC energy storage layer is fabricated from calcined dielectric particles as opposed to a pre-calcined solution and or pre calcined particles used in fabricating MLCC green tape.

The pre-calcined particles allow for the introduction of insulator materials applied to the individual particles and or as layers in between the energy layer and electrodes.

The pre-calcined particles inhibit interaction of the dielectric material and insulator material during sintering. In addition, all of the individual layers of the DEUC thin film are fabricated using spray deposition of nanoparticles in a solution to enable submicron film thicknesses.

The DEUC dielectric Nanoparticles may be synthesized via a variety of methods. The preferred method is the Sol-Gel process discussed in more detail below. The synthesized nanoparticles are calcined at temperatures of 700 up to 1,000 degrees Celsius for duration of 2 to 6 hours to fully complete the CCTO particle formation prior to being coated to form core shell particles or being spray deposited as an energy storage layer.

The CCTO particles need to be fully formed by the calcine heat treatment to avoid interaction between the CCTO and insulator (Al2O3) chemistry.

Heat treating CCTO and Al2O3 chemistry together may cause interaction between the chemicals and affect the composition of the CCTO, Al2O3 or both.

In one embodiment, we have modified the high dielectric materials by altering the amounts of copper and or calcium applied in the stoichiometric CCTO formula, increasing the permittivity values.

In another embodiment we have applied an insulating shell to the dielectric particle forming a core-shell particle. The core-shell particle design locks in the dielectric charge and eliminates interfacial contact between the high dielectric core of the particle and the material that the core shell particle is suspended in.

In a preferred embodiment, printable solutions are used to form each of the DEUC thin film layers are created as Nano-inks to enable ultra-thin (submicron) printed layers within the multilayer thin film.

The printable solutions (Nano-inks) apply Nano particles of less than 500 nanometers in diameter in a solution that includes a solvent, dispersant and binder. The binder is applied up to 20%, or less of the weight of the Nano particles. The solvent may be water based or organic.

The DEUC Thin Film is defined as one or more layers of negative and positive electrodes that are spaced apart by energy storage layers; where the insulated dielectric energy storage media comprises high dielectric particles that are at least one of nano and/or micro sized particles.

One or more DEUC thin films may be stacked to create a larger DEUC Element. One or more DEUC Elements can be interconnected to form a DEUC Stack. One or more DEUC Stacks may form a DEUC Cell. A DEUC Cell Module can be formed from one or multiple DEUC cells.

The DEUC Element may have a cooling tunnel, and where heat within the DEUC Element, Stack or Cell is transferred into the cooling tunnel and moved to and released through a thermal coupler.

In a combined application, at least one DEUC module is coupled with at least one of: one or more solar cells, one or more radioisotope power cells, a photovoltaic system, a thermalvoltaic system, a movement charge system, and a manual charge system, for providing electric charge to the DEUC module and electric energy storage by the DEUC module.

In various alternative embodiments, at least one DEUC module is designed and fabricated to power at least one of micro devices, integrated circuits, electric vehicles, unmanned aerial vehicles, electronic cigarettes, mobile computing devices, laptops, tablets, mobile phones, wireless communication devices, mobile sensor systems.

In further various alternative embodiments, at least one suspended particle DEUC module is designed and fabricated for at least one of: electric power grid support and to provide uninterruptible power supplies.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 1: Describes an Insulated Internal Barrier Capacitor (IIBLC)

FIG. 2: Describes an IBL with Insulator Particles

FIG. 3: An exploded view of an example DEUC Thin Film

FIG. 4: A cross section view of an example DEUC Thin Film

FIG. 5: Energy Layer/Offset Electrode Design for DEUC energy storage layers

FIG. 6: The DEUC Element is an Energy Storage Device with an MLCC Structure

FIG. 7: Example DEUC Module Components and Supporting Electronics DEUC

FIG. 8: Multilayer DEUC Element Mounted on Circuit Board

FIG. 9: DEUC DC/DC Converter and Charge

DETAILED DESCRIPTION

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising i.e., open language. The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

The terms "controller", "computer", "server", "client", "computer system", "computing system", "personal computing system", or "processing system" describe examples of a suitably configured processing system adapted to implement one or more embodiments of the present disclosure. Any suitably configured processing system is similarly able to be used by embodiments of the present disclosure. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources. The terms "wireless network", "wireless communication network", and "wireless communication system", similarly describe a network and system that communicatively couples computers and devices primarily or entirely by wireless communication media. The terms "wired network" and "wired communication network" similarly describe a network that communicatively couples computers and devices primarily or entirely by wired communication media.

The present disclosure provides, according to one embodiment, a hybrid ultra-capacitor/deep cell battery technology and applies a high dielectric material that form an energy storage layer interleaved between anode and cathode conductor elements forming an energy storage element. The inventor has named this new technology as a Dense Energy Ultra Cell. The base component of the Dense Energy Ultra Cell is the DEUC Element. One or more DEUC Elements can be combined to form the Dense Energy Ultra Cell.

In one embodiment, we propose a Dense Energy Ultra Cell (DEUC) where a DEUC Element is the basic building block. The DEUC Element is comprised of: a plurality of dielectric core-shell particles each with a core having a high dielectric constant based on having a permittivity value at or above 10,000, where one or more layers of core/shell dielectric particles of energy storage layers each are less than 10 microns thick, where the insulating shell of the dielectric particle eliminates interfacial contact between the core of the dielectric particles and enables a consistent grain growth of smaller sizes in the dielectric core during sintering, two or more electrical conducting layers that are electrode layers are each less than 10 microns thick, at least one of the layers that are energy storage layers being interleaved between at least two of the electrical conducting layers that are electrode layers. This device could be fabricated using spray deposition to create a DEUC Module or DEUC Multilayer Thin Film. In addition, the core of the particle can be comprised of a calcium copper titanate oxide ($CaCu_3Ti_4O_2$), also known as (CCTO) and or CCTO-X as defined in this submission. The core CCTO may have variations in the amounts of copper and or calcium content to reduce grain boundaries within the CCTO crystal to form CCTO-X. The electrically insulating shell applied to the dielectric core particle may be made from materials such as aluminum oxide (Al2O3). As part of this design, the energy layer particles are encased by the electrode layers and positive and negative terminals.

Spray deposition is a method of printing one or more energy layers, electrode layers or any other subcomponents of the DEUC Element. The spray deposition processes may print alternate electrode, energy layers and or other components to form a DEUC Thin Film. There are a wide variety of spray deposition processes that are included but not limited to ink-jet, ultrasonic, thermal and pressurized spray.

In one such spray deposition method, the spray deposition process may utilize particles suspended in a liquid to form an ink. The ink may be sprayed to form a shape. The ink may comprise particles that make up the energy layer, electrode layer, insulating layer or other subcomponents of the DEUC Thin Film and subsequently the DEUC Element.

Spray deposition could utilize a variety of other materials suspended in a solution that is divided up into droplets that are sprayed to form a shape.

The melt point of CCTO is approximately 1,200 degrees Celsius. The melt point of Al2O3 is approximately 2,000 degrees Celsius.

The DEUC multilayer thin films may be fabricated using conventional multilayer ceramic capacitor methods that include tape casting and electrode printing onto the dielectric tape.

In another embodiment, the Dense Energy Ultra Cell (DEUC) uses a DEUC Element as a basic building block. The DEUC Element is comprised of a plurality of dielectric energy layers, comprised of high dielectric constant particles having a permittivity value at or above 10,000, where one or more layers of the energy storage layers each are less than 10 microns thick. An electrically insulating shell is applied to separate the dielectric material from the electrodes. Two or more electrical conducting layers that are electrode layers are each less than 10 microns thick, at least one of the layers that are energy storage layers being interleaved between at least two of the electrical conducting layers that are electrode layers. This device can be fabricated using spray deposition to create a DEUC module and or DEUC Multilayer Thin Film. The dielectric layer may be comprised of calcium copper titanate oxide ($CaCu_3Ti_4O_2$), also known as CCTO. Variations in the amounts of copper Ca and or TiO2 content in the CCTO may be applied to increase permittivity. Insulating particles such as aluminum oxide (Al2O3) may be applied up to 10% of the weight of the CCTO and or CCTO-X. In this design the energy layers are interleaved in between electrode layers. The particles are suspended in a matrix material such as a polymer that is burned off during the sintering process.

In a third embodiment, the Dense Energy Ultra Cell (DEUC) energy storage device uses the DEUC Element as the basic building block. The DEUC Element is comprised of a plurality of dielectric energy layers, comprised of high dielectric constant particles having a permittivity value at or above 10,000, where one or more layers of the energy storage layers each are less than 10 microns thick. An electrically insulating shell is applied to separate the dielectric material from the electrodes.

Two or more electrical conducting layers that are electrode layers are each less than 10 microns thick, at least one of the layers that are energy storage layers and insulating layers being interleaved between at least two of the electrical conducting layers that are electrode layers.

This device can be fabricated using spray deposition to create a DEUC Multilayer Thin Film. The dielectric layer may be comprised of calcium copper titanate oxide ($CaCu_3Ti_4O_2$), also known as (CCTO).

Variations in the amounts of copper Ca and or TiO2 content in the CCTO may be applied to increase permittivity and increase barrier layer resistivity.

Insulating particles such as aluminum oxide (Al2O3) may be applied up to 15% of the weight of the CCTO and or CCTO-X. In this design the energy layers are interleaved in between electrode layers. The particles are suspended in a matrix material such as a polymer which is burned off as part of the sintering process.

The printable solutions for each layer are comprised of nano-particles that are combined with a solvent and binder. A dispersant may be included in the solution to improve particle dispersion throughout the print and deposition process.

In a preferred embodiment, the printable ceramic solution binder is approximately 10% of the weight of the ceramic powder and the organic solvents are ethyl alcohol, and or ethylene glycol and or methyl ethyl ketone (MEK). In another embodiment the solution is water based.

The printed energy layer contains pre-sintered ceramic material, the printed layer can be sintered at temperatures of between 800 degrees Celsius and 1200 degrees for between 2 to 8 hours.

A printable ceramic solution wherein the Nano particle is a core shell Nano particle where the core is a high dielectric material such as calcium copper titinante oxide and the shell is an insulting material such as Al2O3 and where the shell material reduces the CCTO internal grain growth during the sintering process.

Calcium Copper Titanate Oxide

Pure CCTO bulk properties are optimized by reducing impurities and anomalies to improved performance in the Dense Energy Ultra Cell. The inventor has created a proprietary CCTO utilizing variations in copper content and/or Titanate content and or doping with a metallic material called CCTO-X.

The CCTO-X core shell Nano particle is a unique version of Calcium Copper Titanate Oxide where Calcium Copper Titanate Oxide ($Ca_aCu_3Ti_4O_2$) commonly referred to as CCTO is modified to form the unique CCTO-X ($Ca_aCu_x Ti_yO_2$); where variations in the stoichiometric values (a, x and y) include amounts of Ca, Cu and/or Ti content and where (a) is greater than 1, and or (x) is less than or greater than 3 and/or (y) is less than or greater than 4. The CCTO-X may be doped with one or more materials including but not limited to at least one of calcium oxide, zinc, silver, aluminum, strontium, boron and lanthanum. The CCTO-X particles may be coated with an electrically insulating shell surrounding the CCTO-X particle.

Stoichiometric values are used in the calculation of relative quantities of chemicals, reactants and products to be placed in a chemical reaction process to produce a specific product or compound. Altering the Copper and or Calcium and or Titinate in the stoichiometric formula may increase the resistance at the CCTO grain boundaries of the CCTO structure.

The CCTO dielectric oxide material is derived from compounds found in group IIA, IB, IV of the periodic table, with dopants from a variety of periodic table groups such as cobalt which is in group VIII.

The inventor has found that the dielectric permittivity of $Ca_dCu_xTiyO2$ composition changes with the amount of calcium oxide and or copper applied and with grain sizes and effects on the grain boundaries.

In one embodiment, the CCTO is prepared as at least one of a Nano and a micro particle. In another embodiment, the inventor proposes the addition of Nano composites to CCTO, a core shell design, doping of the CCTO particles or the combination of any or all methods. A core shell design can include, for example, a CCTO core with an insulating shell such as AL203.

According to the current disclosure it is proposed to use either standard CCTO or a proprietary formula CCTO-X, using modified stoichiometric formulas, may be doped applied using a variety of metallic materials including but not limited to zinc, aluminum, silver, boron and lanthanum.

For volume production of the CCTO-X core shell particles, we offer a Sol-Gel, flame assisted spray pyrolysis or supercritical fluid methods. We may use a hydrogen-hydrothermal reactor where disassociated hydrogen and or oxygen and steam are added to the supercritical fluid in a reaction area to form the Nano particles and or coat the Nano particles.

Pure CCTO bulk properties are optimized by reducing impurities and anomalies to improved performance in the Dense Energy Ultra Cell. The inventor has created a proprietary CCTO utilizing variations in stoichiometric values of CCTO varying the copper content and/or Ti content and or doping with a metallic material to form CCTO-X. CCTO-X may be synthesized into a Nano particle with high dielectric permittivity (more than 60,000) without a sinter step in the synthesis.

The three primary methods used to synthesize dielectric Nano particles with high permittivity are:
1. Sol-Gel Method
2. Multi-Stage Flame Spray Pyrolysis (MFSP)
3. HHR Reaction Tube and Supercritical Fluid Nanoparticle Synthesis

Alumina Shell of Core Shell Particle

In one embodiment, an Al2O3 shell is applied to the dielectric particle forming a core-shell particle. The shell is applied as alumina, an early stage of aluminum oxide. There are multiple transition stages of alumina prior to reaching alpha-alumina when the alumina is sintered at temperatures above 1,100 degrees Celsius. The first stage of alumina is the removal of free water and then chemically combined water; this occurs over a range of temperatures between 180-600° C. As the alumina is heat treated up to temperatures of 1,100° C., it remains flexible. The core dielectric material experiences grain growth as temperatures are raised and when the core particle is sintered at ~1,080 degrees Celsius. The alumina remains flexible and can expand across the core forming a thinner shell as the core material expands in size.

The dehydrated alumina is principally in the form of activated alumina and the surface area gradually decreases as the temperature rises towards 1000° C.

The calcination at temperatures>1,100° C. converts this to the more stable α-form. By maintaining sintering temperatures at under 1,100° C., the dielectric core-shell particles retains a flexible coating of aluminum oxide.

The CCTO and or CCTO-X particles form an internal barrier layer capacitor (IBLC) when sintered and the Al2O3 shell adds in insulating layer creating an insulated internal barrier layer capacitor (IIBLC). In FIG. 1 the CCTO and or CCTO-X particles forms an outer layer (102) around the core (101).

In another embodiment, the alumina shell is a partial shell with alumina particles attached to the core.

Energy Storage Matrix

The energy storage layer, according to an example embodiment, comprises micro and/or Nano particles simple particles, doped particles, core shell particles, composite particles or a combination. The core shell particles may be mixed in a binder in preparation for sintering.

We have enabled printing of the electrode and energy storage layers. To print the energy storage layer, a printable solution is comprised of Nano particle ceramic powder combined with either a water-compatible polymer binder or a solvent compatible binder, said binder being applied as up to 20 percent when compared to the weight of the said ceramic powder. The solution can be dried to form a solid ceramic layer, and or sintered to form a high dielectric ceramic layer.

In one embodiment, the printable ceramic solution binder is approximately 10% of the weight of the ceramic powder and the solvents may be ethyl alcohol, and or ethylene glycol and or methyl ethyl ketone (MEK).

In another embodiment, the printable ceramic solution uses a binder with a photo initiator that reacts to ultraviolet light and rapidly cures.

The printed energy layer contains pre-sintered ceramic material. The printed layers can be sintered at temperatures of between 900 degrees Celsius and 1,150 degrees for between 2 to 8 hours.

A printable ceramic solution wherein the Nano particle is a CCTO particle with variations in the stoichiometric formula varying the amounts of copper and or calcium and or titanate to enable a high permittivity and increased resistance at the CCTO barrier layer.

A printable ceramic solution wherein the Nano particle is a core shell Nanoparticle where the core is a high dielectric material such as Calcium Copper Titanate Oxide and or CCTO-X and the shell is an insulting material such as Al2O3 and where the shell material reduces the CCTO internal grain growth during the sintering process.

In another embodiment, insulating particles such as, but not limited to, Al2O3, NiO, SnO, SiO, TeO particles are added to the CCTO mixture in the energy storage layers to increase resistivity across the dielectric layer.

Another method of increasing the resistivity of the energy storage layer uses a high pressure $O_2$ of between 2 to 8 atmospheres during heat treatment of the CCTO and or CCTO-X particles.

Another method of increasing the resistivity of the energy storage layer uses a high pressure $O_2$ of between 2 to 8 atmospheres during calcination of the CCTO and or CCTO-X particles Another method of increasing the resistivity of the energy storage layer uses a high pressure $O_2$ of between 2 to 8 atmospheres (atm) during sintering of the CCTO and or CCTO-X energy layers.

Electrodes

There are multiple types of electrodes applied to the DEUC design. The primary electrodes are the inner electrodes applied in between the energy storage layers and the secondary electrodes that connect the inner electrodes in a left and right array.

The inner electrode layer is comprised of a proprietary conductive paste or ink with similar shrinkage characteristics as the other layers in the DEUC design. The base of the electrode layer formula is made from CCTO and or CCTO-X dielectric particles in a polymer slurry. The dielectric particles are the same particles applied in the energy storage layer and therefore have similar shrinkage and or growth as the energy storage layers. To simplify the design, we use the same dielectric particles in each layer.

The electrode layer dielectric slurry is loaded with conductive materials such as nickel Nano particles and or carbon nanotubes and or graphene. The conductive particles should have a melt point equal to or greater than 1,200 degrees Celsius. The conductive paste and or printable ink solution is deposited and subsequently dried to allow for the deposition of the next layer to be deposited in the DEUC thin film.

The electrodes may be fabricated in a variety of methods, including but not limited to spray deposition, vapor deposition, extrusion, casting, injection molding and print spray.

In another embodiment, the printable electrode solution uses a binder with a photo initiator that reacts to ultraviolet light and rapidly cures.

An example fabrication method for the inner electrodes in the DEUC thin film is as follows. One or two nickel powder sizes are used. A bimodal powder size allows for denser packing of the nickel particles. The nickel particles may be under 500 nm in particle sizes.

The inner electrode is comprised of nickel powder(s) as the conductive material, ceramic paste (CCTO powder(s) and polymer vehicle) in a 40:60 ratio, a polymer vehicle and a dispersant.

The estimated ratio of the composition of the electrode material is
   conductive particles 47%
   dielectric particle slurry 30%
   binder (with optional photo initiator) 20%
   dispersant 3%.

As discussed, the fabrication of the DEUC Multi-Layer Thin Film includes a heat treatment where the binders are burned-off and the layers are sintered at temperatures of up to 1200° C.

During the heat treatment, the internal electrode layers may be changed and deformed in volume with a different affect than the dielectric layers.

In order to ensure a unified effect of the heat treatment across all layers, the dielectric material applied in the energy storage layer is also applied in the other layers.

The first stage of the heat process is a de-binder process where the DEUC Multi-Layer Thin Film is heated to around 500 degrees Celsius to burn off the binders that are holding the particles of each layer in place. In the binder burn-off process pure nickel particles are easily oxidized and may grow in volume. One method of addressing this is to coat the nickel particles with nickel oxide.

During the heat process, the nickel oxide coating layer of nickel burned off reducing the nickel oxide to a nickel metal, resulting in shrinkage. In order to reduce sintering shrinkage of nickel particles, and have the electrode layer react similar to the other layers in the Multi-Layer Thin Film, CCTO particles are added to the nickel electrode mixture.

According to an aspect of the present invention, the electrode printable solution includes: a binder; a solvent; and metal powder for an internal electrode, including a nickel particle coated with a nickel nitride and a ceramic. The binder may have a photo initiator to induce rapid curing under ultraviolet light

DEUC Element Fabrication

A method of fabrication of a Dense Energy Ultra Cell DEUC, Element, Stack, Cell Module and or Array, comprising:
   a. Preparation of an electrode material print solution
      An electrically conducting print solution is created using nickel Nanoparticles that are loaded into a dielectric slurry and formed into a UV curable spray and or printable solution, and
   b. Synthesis of CCTO and or CCTO-X Printable Solution
      Dielectric Nano particles of CCTO and or CCTO-X can be synthesized by a variety of methods, our preferred methods is Sol-Gel. In one embodiment, the dielectric particles are printed as a solution.
   c. The Nano particles created from the synthesis step above, may be further processed to apply an insulating shell creating core shell particles.
   d. DEUC Thin Film
      The electrode layer print solution, energy storage layer solution and an optional insulator solution are applied as alternating layers where the electrodes are offset, left and right to form positive and negative electrode arrays, and
   e. Sintering of unified DEUC Thin Film
      where the unified multilayer thin film is cured, the binder(s) and additives are burned off, the multilayer films are annealed and heat treated ("sintered") together at up to 1200 degrees Celsius, and
   f. Packaging of a DEUC Element using one or more DEUC stacks
      The left and right electrodes in the unified DEUC thin film stack are connected to terminals to form a DEUC Element, and
      One or more DEUC Elements may be applied in a stack and connected in one or more either series or parallel circuits to create the DEUC Stack, and
      One or more DEUC Stacks may be combined and interconnected in series and or parallel circuit(s) to form a DEUC Cell, and
      One or more DEUC Cells may be combined and interconnected in series and or parallel circuit(s) to form a DEUC Module, and
      One or more DEUC Modules may be combined and interconnected in series and or parallel circuit(s) to form a DEUC Module Array

DEUC Element Layer Designs

Design One: The energy layer is comprised of core shell particles (core dielectric and insulting shell). The energy layers are placed in between the electrodes. In FIG. 5 the energy layer (503) is interleaved in between the electrode layers (501). The electrode layers are surrounded by an insulating material that can be comprised of the energy layer material (502). The electrode layers are offset to form right and left electrode arrays (501). This configuration can be applied to create a multilayer DEUC Thin Film.

Design Two: The energy layer is comprised of dielectric particles forming energy storage layers. In FIG. 5 the energy layer (503) is interleaved in between the electrode layers (501). The electrode layers are surrounded by an insulating material that can be comprised of the energy layer material (502). The electrode layers are offset to form right and left electrode arrays (501). This configuration can be applied to create a multilayer DEUC Thin Film.

In FIG. 4 we show a cross section view of a DEUC Thin Film 401 where both metal electrode layers (402) and energy layers (403) are integrated. The electrodes are offset, alternating left to right in the stack with an electrode collector (404a) interconnecting the electrodes on the left and another electrode collector (404b) interconnecting the electrodes on the right. The multiple electrodes connected to the collectors form a parallel circuit.

Energy layer (406) insulators separate the right and left electrodes. The insulator may be the CCTO and or CCTO-X energy layer material.

Electrodes (402) may be applied on the top or bottom of the stack and as electrode collector.

The DEUC energy layers can be formed in thicknesses of under 500 nanometers. When the multilayer thin film is sintered, the CCTO and or CCTO-X particles experience grain growth. The ultra-thin layers after grain growth are still less than 10 microns thick. The application of these ultra-thin energy and electrode layers forms a parallel circuit.

Energy Layer Resistivity

The total resistivity of the DEUC battery is based on the cumulative resistance of all of the individual energy layer resistance. In a DEUC Element there are many energy layers. This enables total resistivity that can reach into the Tera-ohms for a DEUC Element. A high level of energy layer resistivity lowers the leakage current and the dissipation factor for the DEUC Element and DEUC Cell. This means the DEUC cell will retain a charge for a longer period of time.

The sintering of the CCTO forms an internal barrier layer capacitor and the barrier layer has resistivity. This barrier layer resistivity can be enhanced by the addition of an insulating material.

One method of applying insulating material between the outer barrier layers of the CCTO particles is to apply Nano particles. In FIG. 2 we illustrate the application of insulating particles positioned in between the CCTO and or CCTO-X particles to raise the internal resistivity of the dielectric material. Such Nanoparticles include but are not limited to Al2O3 and or B2O3. We have applied between 2% and 30% particle loading to increase resistivity. The increased loading has the effect of lowering the permittivity of the CCTO. A balance between resistivity and permittivity is desired. The target resistivity is between 1 mega-ohm and 100 terra-ohms, while maintaining a permittivity of 100,000 or greater.

Another method of applying Al2O3 to CCTO is to coat the CCTO particles. In this method, CCTO powder is suspended in Al(NO3)3 aqueous solution, with NH4OH applied to synthesize an Al(OH)3 precipitate onto the CCTO particles. The obtained CCTO/Al2O3 powders are calcined at 850° C. for 4 h. We have varied the Al2O3 content between 1 wt %, and 15 wt %. A polymer binder is added to the CCTO/Al2O3 powder and a thin film sheet is created. The sheet is sintered at 1100° C. for 4 h. Electrode material was applied to a piece of the CCTO/Al2O3 sheet to obtain permittivity and resistivity measurements.

Current/Amperage

The total current (amperage) supported by of the DEUC battery is based on the cumulative amperage allowed to pass through the individual electrode layers. In a DEUC Element there are many electrode layers. This enables a high amperage or current to flow through the DEUC Element and DEUC Cell based on many lower current flows that add up across the electrode layers.

Fabrication Using MLCC Industry Methods

The DEUC energy storage module may be fabricated using multilayer ceramic capacitor manufacturing techniques, with the exception of applying CCTO and or CCTO-X as the dielectric layer and the option of applying an insulator layer in between the energy storage layer and electrode layer and the option of applying pressure during one or more heat treatments.

In FIG. 6 we illustrate the DEUC design, using the DEUC energy storage layer (601) in an Multi-Layer Ceramic Capacitor (MLCC) format with external electrodes (602) and internal electrodes (603).

DEUC Thin Film Applied as an Energy Storage Device

The DEUC Thin Film, fabricated by spray deposition, printing or through a stretching process, can be applied as a single layer DEUC Element, or a multi-layer DUEC Element. The DEUC Thin Film has electrodes on the sides. The DEUC Thin Films can be stacked to any height to form a DEUC Element. The left and right electrode arrays are interconnected by an electrode collector to complete the interconnection and form a DEUC Element as shown in FIG. 7.

The DEUC layers, electrode layers and insulator layers are all designed to have matched shrinkage and physical reduction characteristics. All layers have a CCTO ceramic particle content designed to assist in material shrinkage during heat processing.

In FIG. 7, we illustrate the building blocks of the DEUC Module. The DEUC Element (701) is formed from the DEUC multilayer thin films and resembles a multilayer ceramic capacitor design.

The DEUC Elements (701) are stacked (702) and the stacks are grouped to form a DEUC Cell (703). The DEUC Cells (703) are grouped to form the DEUC Module (704).

Energy Management sensor modules (711) and or DEUC voltage control modules (711) may be placed to collect information from a single DEUC Element, a DEUC Stack, a DEUC Cell, a DEUC Module or an array of DEUC Modules.

Voltage converters (712) may be applied to maintain a consistent voltage output from the DEUC Element, DEUC Stack, DEUC Cell, DEUC Module or an array of DEUC Modules.

Shock absorbing layers may be placed all around the DEUC thin films and or have shock absorbing layers in between two or more DEUC thin films.

The DEUC may have an electrically isolating layer around the DEUC Element, Stack, Cell or Module to isolate the DEUC module and or cell from an electrical and or magnetic field.

FIG. 8 illustrates the mounting of DEUC multilayer elements (801) onto a circuit board (802) to create a DEUC array. Multiple DEUC arrays may be combined to create a larger energy storage module. The DEUC multilayer elements have energy storage layers interleaved between electrodes. These electrodes are offset alternating with a left offset and right offset. This allows for separate electrode collector circuits to interconnect the left electrodes and a separate collector circuit to interconnect the right electrodes forming a combined left (803) and right (804) electrode for the DEUC multilayer element array mounted on the circuit board. One or more DEUC multilayer element arrays may be used to create a DEUC energy storage module.

FIG. 9 illustrates an example DEUC DC/DC Convertor and Charge Circuit.

DEUC Energy Storage Device Applications

The DEUC is an energy storage device that can be applied to a broad range of applications and scaled from a micro device to a large system array. Examples of DEUC applications are circuit electronics, mobile devices, electric vehicles, residential and commercial applications, uninterruptible power supplies, support of the electric grid, and the storing of electrical power generated from alternative energy sources such as wind and solar.

The inventor's modeling data has demonstrated DEUC recharge cycles of over 1,000,000 without degradation even with deep cycling and rapid charging of the DEUC. The DEUC provides a rapid recharge cycle time and stores an estimated 4× the energy of a lithium-ion battery. An array of DEUCs could be configured as electrical energy stations to charge vehicles.

The following represents some of the DEUC module applications:

The DEUC module can be designed and fabricated to store and provide electrical power to at least one of:
micro devices and integrated circuits,
electric vehicles,
unmanned aerial, terrestrial or water vehicles,
electronic cigarettes,
one or more of: mobile computing devices, laptops, tablets, mobile phones, wireless communication devices, and mobile sensor systems,
an electric power grid,
solar, wind, and other alternative energy systems support, and
one or more uninterruptible power supplies.
The DEUC Modules can be coupled with;
one or more solar cells;
one or more radioisotope power cells;
a photovoltaic system;
a thermalvoltaic system;
a movement charge system; and
a manual charge system; and being designed and constructed for providing electric charge to the DEUC module and electric energy storage by the DEUC module.

The above applications do not represent the limits of the DEUC Module, many additional applications can be envisioned.

The features and advantages described in the specification are not all inclusive, and particularly, many additional features and advantages will be apparent to one of ordinary skill in the art in view of the description, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The present subject matter can be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a conversion to another language, code or, notation; and b reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory ROM, flash memory, disk drive memory, CD-ROM, and other permanent storage. Additionally, a computer medium may include volatile storage such as RAM, buffers, cache memory, and network circuits. Furthermore, in certain embodiments of the computer readable medium, other than a computer readable storage medium as discussed above, the computer readable medium may comprise computer readable information in a transitory state medium such as a network link and/or a network interface, including a wired network or a wireless network, that allow a computer to read such computer readable information.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

DEUC Energy Management System

The combination of very high capacitance and very low ESR have enabled supercapacitors to provide new methods for solving common problems such as backup power solutions. The DEUC can provide a highly reliable power system. The DEUC management system is able to monitor and report the "health" of the DEUC.

Energy Management System

The DEUC Elements, Stacks and or Cells may be connected in series or parallel which may require electrical circuit protection and or balancing of the DEUC energy storage components. The DEUC Management System (DMS) provides a means to provide a reliable, flexible, high energy storage and performance power solution.

The DEUC system can be applied in a wide variety of applications such as a power source, energy storage application for grid and alternative energy systems and power backup.

The DEUC Energy Management System can be applied as a standalone backup controller for power backup applications. The device can charge, balance and protect DEUC cells applied in series. Input power fail threshold, capacitor charge voltage and regulated minimum backup voltage can all be programmed with external resistors. The DEUC Management System monitors input, output and capacitor voltage and current. The Equivalent Series Resistance (ESR) can be adjusted to ensure minimum leakage, capacitor stack voltage and capacitance and stack ESR. All system parameters and fault status can be read back over a network connection. Alarm levels can be set to alert the system to a sudden change in any of these measured parameters.

The DEUC Energy Storage Management System (EMS) maintains optimized environmental and performance parameters for the DEUC modules. Embedded sensors monitor DEUC performance and the application of cooling systems to maintain optimum performance. The EMS system is a network based system for sensor reporting and EMS data management.

EMS monitors are positioned on each DEUC Stack to monitor the state of the DEUC. Elements reporting various measurements including:

Voltage output of individual DEUC Elements and the DEUC Stack
  Temperature of each DEUC Element and coolant intake and output temperatures where cooling devices are applied
  Current in or out of the DEUC Element and Stack Health monitoring analysis is applied data from the monitoring positions:

Charge Cycle Monitoring
  State of Charge (SOC) and depth of discharge (DOD)
  State of health (SOH), a variously-defined measurement of the overall condition of the DEUC Elements, Stacks, Cells, Modules and the DEUC Array
  Current in or out of the DEUC Elements, Stacks, Cells, Modules and the DEUC Array
  Self-Healing:
  The DEUC EMS system would be able to disconnect a DEUC Stack, Module or Cell from the array if necessary to enable improved operation Additionally, the DEUC EMS can calculate statistics, such as:

Maximum charge current as a charge current limit (CCL)
  Maximum discharge current as a discharge current limit (DCL)
  Energy [kWh] delivered since last charge or charge cycle
  Internal impedance of a DEUC Element (to determine open circuit voltage)
  Charge [Ah] delivered or stored (sometimes this feature is called Coulomb counter)
  Total energy delivered since first use
  Total operating time since first use
  Total number of cycles

DEUC Energy Control System

A voltage regulator may be applied to the DEUC at the Element, Stack, Cell and or Module level. The voltage regulator is designed to maintain a constant output voltage level. The DEUC Element, Stack, Cell, Module or Array of DEUC Modules may have an operating voltage that is higher or lower than the desired output voltage for an application. There are many types of voltage regulators including a feed-forward design that may include a negative feedback control loop.

The DEUC voltage regulation and electrical control module (VREC) provides voltage regulation and additional features such as, but not limited to, those listed below.

Voltage Regulation
  Controller IC provides battery charging plus DC/DC converter for desired voltages
  Charger may be above or below battery voltage
  Simultaneous charging and regulating
  Standalone DEUC charger including charge termination, overvoltage protection, shorted-cell, module, or element detection and battery recharge
  Reduced component architecture In FIG. 9, we provide an example DC to DC converter and charging circuit for the DEUC. There are many different types of circuits that could be applied to accomplish this.

DEUC Module Charging

DEUC module charging is similar to a battery with several exceptions.

The DEUC can be charged at full current for the whole charge cycle for a rapid charge.
  When the final "float" voltage is reached, no additional charge can be stored by the capacitor and charging must stop.
  Multiple DEUC cells in series are monitored to ensure that equal rates of voltage increase across each capacitor cell as the stack is charged.
  Additional safety features need to be in place to assure that none of the capacitors exceeds its maximum voltage rating during the charging cycle.
  A balancing system is applied to assure that once the stack is charged, all of the cells are forced to the same voltage and do not drift apart over time due to self-discharge differences.

DEUC Overview

The Dense Energy Ultra Cell (DEUC) energy storage device comprised of one or more DEUC Elements where the DEUC Elements are comprised of a plurality of dielectric particles and or core shell dielectric particles form layers of less than 10 microns thick, with an internal resistivity of greater than 100 mega-ohms, that are interleaved in between electrode layers to form a multi-layer thin film, and The layers of the multi-layer thin films are deposited via a spray and or print process.

The two or more electrode layers are deposited as an electrically conducting printable solution comprised of conducting Nano particles, a binder and a solvent. The electrode layers are offset left and right in alternating layers to form the left and right inner electrode arrays.

One or more dielectric layers are deposited as a printable solution comprised of calcium copper titanate oxide (CCTO) particles and or a modified stoichiometric formula of calcium copper titanate oxide (CCTO-X), a binder and solvent.

The CCTO and or CCTO-X particles have an electrically insulating material such as alumina added to the mixture as a shell coating of the CCTO and or CCTO-X particles and or separate particles.

The CCTO-X is comprised of modified calcium copper titanate oxide ($CaCu_3Ti_4O_2$), also known as (CCTO-X), with variations in the amounts of copper and or calcium and or titanate content to increase the resistivity and permittivity when sintered.

The energy storage layer and electrode layers have similar shrinkage and growth affects when subjected to heat.

The unified multilayer thin film is heat treated together at 500 degrees Celsius to burn off the binders and other chemicals present.

The one or more unified multilayer thin film(s) are sintered at up to 1,200 Celsius, combining all of the layers into a multilayer ceramic DEUC Element, and External electrodes are applied to the left and right inner electrode arrays.

The CCTO and or CCTO-X particles (grains) form in internal layer barrier capacitor (IBLC) when sintered.

The electrically insulating shell and or particles increases resistivity across the dielectric energy storage layer and reduces charge dissipation.

The DEUC Elements (as shown in FIG. 7) are used as a building block to create the following;
  a. A DEUC Cell
     where one or more DEUC Elements are connected series and or parallel circuit(s) to form a DEUC Cell, and
  b. A DEUC Module
     where one or more DEUC Cells are combined and interconnected in series and or parallel circuit(s) to form a DEUC Module, and
  c. DEUC Module Array
     where one or more DEUC Modules are combined and interconnected in series and or parallel circuit(s) to form a DEUC Module Array.

As shown in FIG. 7, the Dense Energy Ultra Cell can be comprised of stacked DEUC Elements interconnected form one or more DEUC Stacks within a DEUC Cell.

The electrode layer conducting particles are nickel particles.

The printable solutions have a photo inducer included in the mixture that reacts to an ultraviolent light to rapidly cure the binder in the solution.

The CCTO-X is doped with electrically insulating additives, such as, but not limited to Al2O3 (aluminum oxide), B2O3 (Boron trioxide), batio3 are added to create a high dielectric energy storage layer to maximize energy density with a high resistivity to minimize the charge loss.

The electrically insulating aluminum oxide (Al2O3) particles are added to the CCTO and or CCTO-X mixture in the energy storage layers to create insulating particles in between the CCTO and or CCTO-X particles, raising the layer resistivity.

The sintering process has an intermediate step to calcine the mixture at between 700 and 900 degrees Celsius before continuing to the sintering temperature.

The sintering process is a two stage process that ramps to a temporary high sintering temperature with a short dwell time and moves to a lower sintering temperature for a longer dwell time.

The said energy layers and electrode layers are separated by an insulator.

The one or more heat treatments of the CCTO and or CCTO-X particles, and or energy layer, and or multilayer thin film utilizes pressure of 2 to 8 atmospheres during the one or more heat treatments.

A method of fabrication of a Dense Energy Ultra Cell DEUC, Element, Stack, Cell Module and or Array, comprises:
  a. Preparation of an electrode material print solution
     An electrically conducting print solution is created using nickel Nano particles that are loaded into a dielectric slurry and formed into a UV curable spray and or printable solution, and
  b. Synthesis of CCTO and or CCTO-X Printable Solution
     Dielectric Nano particles of CCTO and or CCTO-X can be synthesized by a variety of methods, our preferred methods is Sol-Gel. In one embodiment, the dielectric particles are printed as a solution.
  c. The Nano particles created from the synthesis step above, may be further processed to apply an insulating shell creating core shell particles.
  d. DEUC Thin Film
     The electrode layer print solution, energy storage layer solution and an optional insulator solution are applied as alternating layers where the electrodes are offset, left and right to form positive and negative electrode arrays, and
  e. Sintering of unified DEUC Thin Film
     where the unified multilayer thin film is cured, the binder(s) and additives are burned off, the multilayer films are annealed and heat treated ("sintered") together at up to 1200 degrees Celsius, and
  f. Packaging of a DEUC Element using one or more DEUC stacks
     The left and right electrodes in the unified DEUC thin film stack are connected to terminals to form a DEUC Element, and
     One or more DEUC Elements may be applied in a stack and connected in one or more either series or parallel circuits to create the DEUC Stack, and
     One or more DEUC Stacks may be combined and interconnected in series and or parallel circuit(s) to form a DEUC Cell, and
     One or more DEUC Cells may be combined and interconnected in series and or parallel circuit(s) to form a DEUC Module, and
     One or more DEUC Modules may be combined and interconnected in series and or parallel circuit(s) to form a DEUC Module Array The DEUC device is designed and fabricated to store and provide electrical power to a broad range of applications listed below. This is an example list and there are many other applications that the DEUC can be applied to.
  micro devices and integrated circuits, electric vehicles, aircraft, boats, ships, unmanned aerial, terrestrial or water vehicles, electronic cigarettes, mobile computing devices, laptops, tablets, mobile phones, wireless communication devices, and mobile sensor systems, energy storage for an electric power grid, power backup, energy storage for solar, wind, and other alternative energy generation systems, and uninterruptible power supplies.

Shock insulating material is applied to the DEUC Element, Stack, Cell and or Module.

A shield is applied to protect the DEUC Element, Stack, Cell and or module from an electrical or magnetic field.

The invention claimed is:

1. A method of fabrication of a Dense Energy Ultra Cell (DEUC) energy storage device selected from the set of: a DEUC Element, a DEUC Stack, a DEUC Cell Module, and a DEUC Module Array, the method comprising:
  a. preparation of an electrode material spray deposition solution by creating an electrically conducting spray deposition solution using nickel nano particles that are deposited using a spray solution;
  b. synthesis of a calcium copper titanate oxide (CCTO) and/or a modified stoichiometric formula of calcium copper titanate oxide (CCTO-X) nanoparticles suspended in a matrix material;
  c. spray deposition of synthesizing dielectric nanoparticles of CCTO and/or CCTO-X to deposit an energy storage layer;
  d. forming an insulator spray deposition solution comprising insulating nano particles suspended in a liquid form;
  e. forming at least one DEUC multilayer thin film by applying an electrode layer spray deposition solution, an energy storage layer spray deposition solution, and an insulating layer spray deposition solution, as alternating layers where the electrode layers are offset, left and right to form positive and negative electrode arrays;
  f. sintering at least one unified DEUC multilayer thin film by curing a unified multilayer thin film, burning off binder(s) and additives from the layers in the at least one DEUC multilayer thin film, and annealing and heat treating the at least one unified DEUC multilayer thin film in a sintering process at a temperature in the range of between 800 degrees Celsius and at up to 1200 degrees Celsius to create a multilayer ceramic DEUC Element; and g. packaging a DEUC Element by using one or more DEUC stacks, where left and right electrode layers in a unified DEUC multilayer thin film stack are connected to terminals to form a DEUC Element.

2. The method of claim 1, wherein one or more DEUC Elements are applied in a stack and connected in one or more either series circuits or parallel circuits to create a DEUC Stack.

3. The method of claim 2, wherein one or more DEUC Stacks are combined and interconnected in series and/or parallel circuit(s) to form a DEUC Cell.

4. The method of claim 3, wherein one or more DEUC Cells are combined and interconnected in series and/or parallel circuit(s) to form a DEUC Module.

5. The method of claim 4, wherein one or more DEUC Modules are combined and interconnected in series and/or parallel circuit(s) to form a DEUC Module Array.

6. The method of claim 1 wherein the DEUC energy storage device is designed and fabricated to store and provide electrical power to at least one product selected from the following set of products:

a micro device and an integrated circuit; an electric vehicle; an aircraft; a boat; a ship; an unmanned aerial, terrestrial or water vehicle; an electronic cigarette; a mobile computing device; a laptop computer; a tablet computer; a mobile phone; a wireless communication device; a mobile sensor system; an energy storage for an electric power grid; a power backup; an energy storage for a solar, wind, or other alternative energy generation system; and an uninterruptible power supply.

7. The method of claim 1, wherein shock insulating material is applied to at least one DEUC energy storage device selected from the set of: a DEUC Element, a DEUC Stack, a DEUC Cell Module, and DEUC Module Array.

8. The method of claim 1, wherein a shield is applied to at least one DEUC energy storage device selected from the set of: a DEUC Element, a DEUC Stack, a DEUC Cell Module, and DEUC Module Array, to protect the DEUC energy storage device from an electrical or magnetic field.

9. The method of claim 1, further comprising:

applying an insulating shell to the synthesized dielectric nano particles of CCTO and/or CCTO-X, thereby creating core shell particles.

* * * * *